Patented Aug. 14, 1945

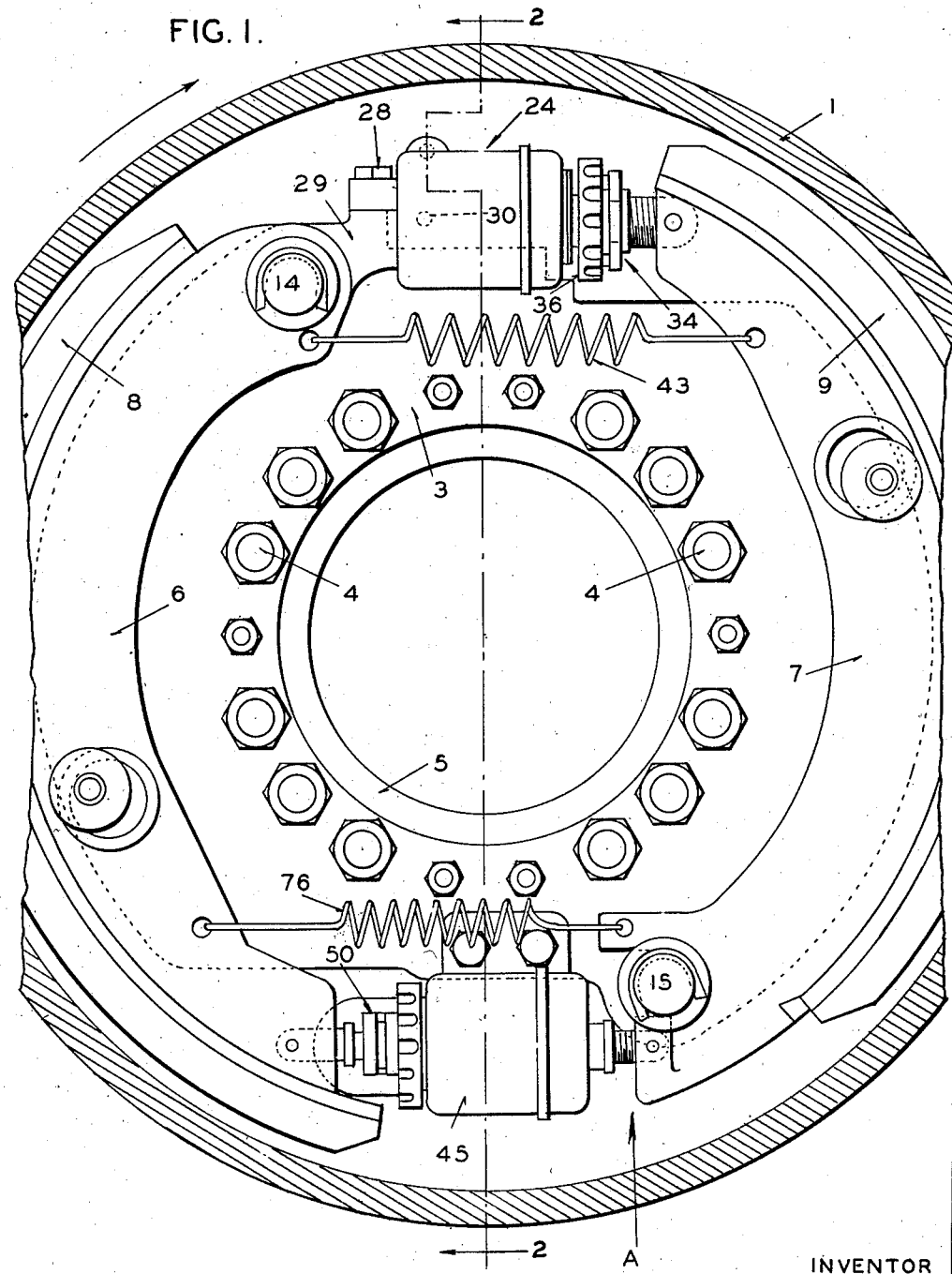

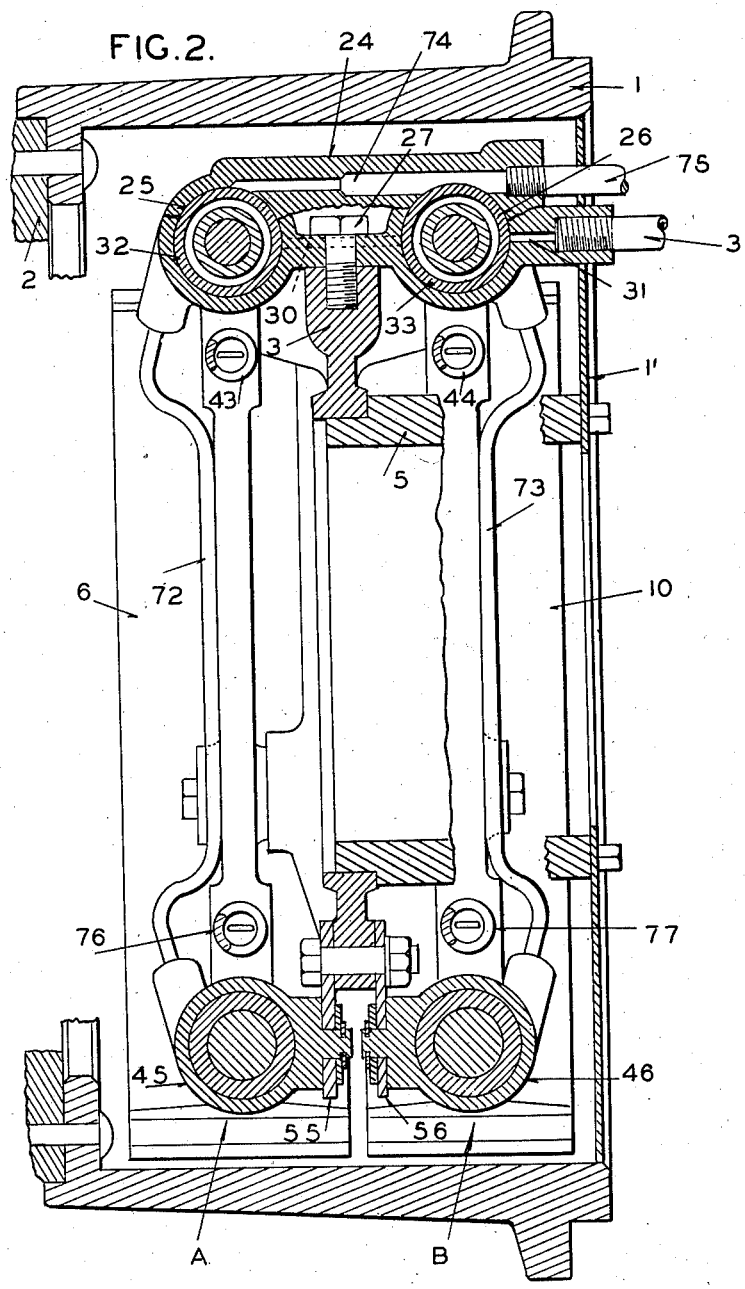

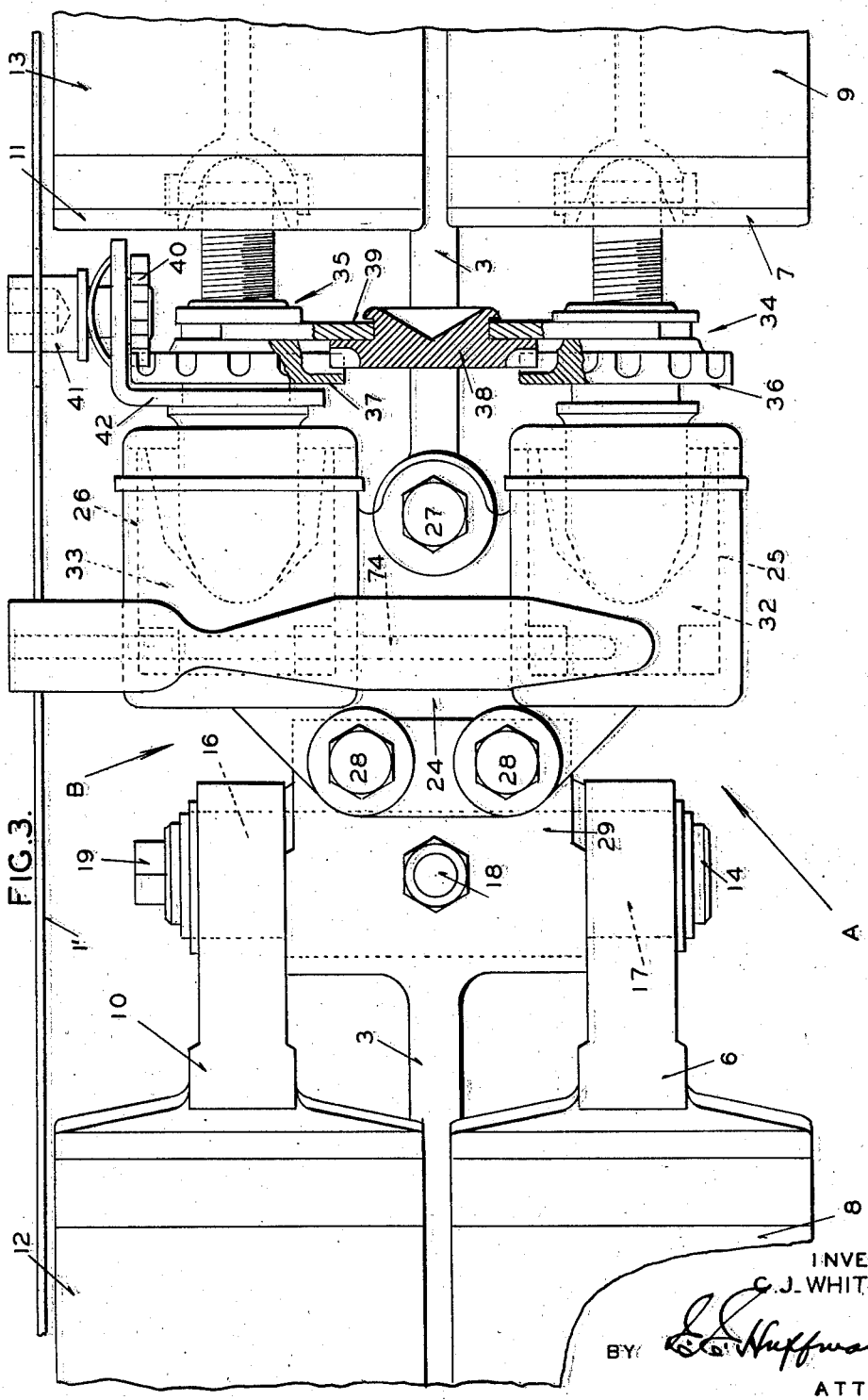

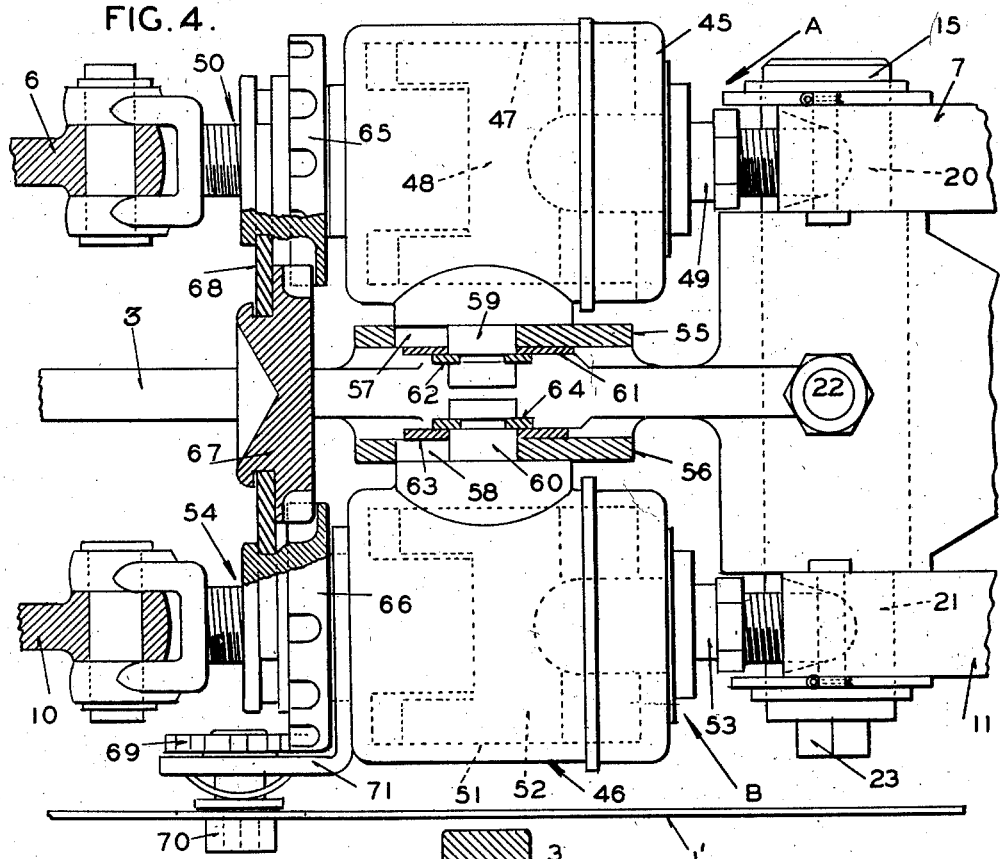
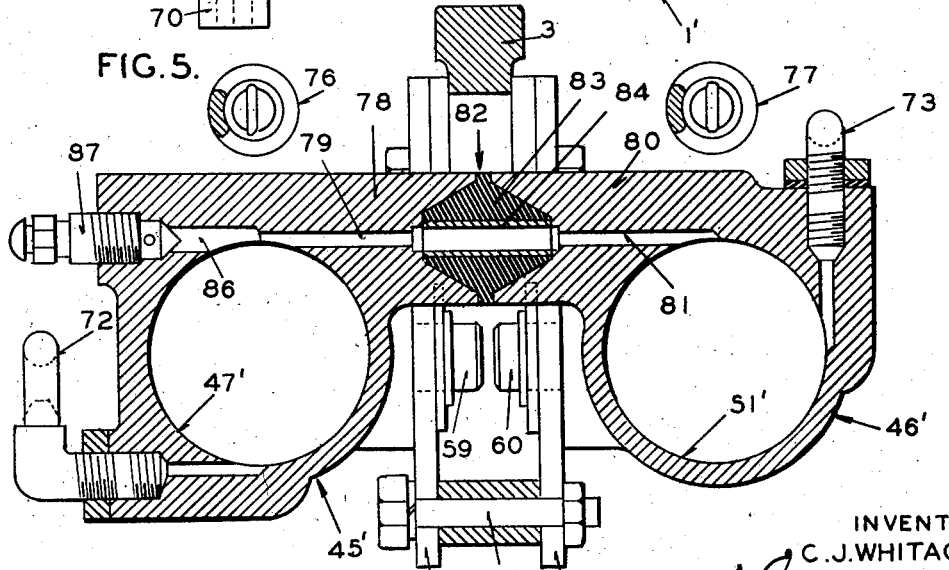

2,382,927

UNITED STATES PATENT OFFICE 2,382,927

DUAL BRAKE

Clarence J. Whitacre, St. Louis, Mo., assignor to Wagner Electric Corporation, St. Louis, Mo., a corporation of Delaware Application December 9, 1943, Serial No. 513,569

12 Claims. (Cl. 188—152)

My invention relates to braking mechanism and more particularly to such a mechanism in which dual brakes are embodied.

One of the objects of my invention is to produce a dual brake assembly in which the brake shoes and actuating means are all mounted in an improved manner on a single central supporting member.

Another object of my invention is to produce an improved hydraulically-actuated dual brake which is compact in construction with the actuating motors and brake shoes so arranged that both brake assemblies will be effective to provide maximum braking action in the normal forward rotation of the member to be braked.

Other objects of my invention will become apparent from the following description taken in connection with the accompanying drawings in which Figure 1 is a view of one side of a dual braking mechanism embodying my invention, said view showing one of the brakes with the drum in section; Figure 2 is a vertical sectional view of the braking mechanism, said view being taken on the line 2—2 of Figure 1; Figure 3 is a top view of the braking mechanism with the drum removed; Figure 4 is a bottom view of the braking mechanism with the drum removed; and Figure 5 is a sectional view showing an interconnecting means for the lower fluid motors.

Referring to Figures 1 to 4 in detail, numeral 1 indicates a brake drum which is secured to a member 2 carried by a member to be braked, such as a vehicle wheel, and 3 indicates an annular supporting plate which is secured by bolts 4 to a fixed member 5, such, for example, as a member carried by the axle housing of a vehicle. Mounted on opposite sides of this supporting plate are two brakes generally indicated by the letters "A" and "B." The brake "A" consists of two shoes 6 and 7 having linings 8 and 9 for cooperation with the internal cylindrical surface of the drum and the brake "B" consists of two shoes 10 and 11 having linings 12 and 13 for cooperation with the drum. Shoes 6 and 10 are alike as are also shoes 7 and 11.

The supporting plate 3 carries anchor pins 14 and 15 at substantially diametrically opposite points. As best shown in Figure 3, anchor pin 14 is provided with eccentric end portions 16 and 17 which extend from opposite sides of the supporting plate, portion 16 having one end of brake shoe 10 pivotally mounted thereon and portion 17 having one end of brake shoe 6 pivotally mounted thereon. The anchor pin is held from rotation by a setscrew 18 and may be turned for adjusting purposes by the use of a wrench on the squared end 19 when the setscrew is loosened. As best seen in Figure 4, the anchor pin 15 is similarly constructed having eccentric end portions 20 and 21, portion 20 having the lower end of shoe 7 pivotally mounted thereon and portion 21 having the lower end of shoe 11 pivoted thereon. The anchor pin is held from rotation by the setscrew 22 and a wrench receiving squared end 23 is provided for adjusting purposes. The lower ends of shoes 7 and 11, which cooperate with pivot pin 15 are formed with notched ends in order that these ends may be moved away from the pivot pin under certain conditions whereas shoes 6 and 10 are arranged for pivotal movement only on anchor pin 14.

At the top of the supporting plate is mounted a single member 24 which extends on opposite sides of the plane of the plate and is formed with parallel cylinders 25 and 26. This member is bolted to the top of the supporting plate by a bolt 27 and also by bolts 28 to a projection 29 adjacent anchor pin 14. As best seen in Figure 2, the interiors of the cylinders at one end are in communication with each other by a bored crosspassage 30. An aligned inlet passage 31 is provided for cylinder 26 to which is connected a conduit 31' coming from a suitable source of fluid pressure such, for example, as a master cylinder device.

Within cylinder 25 is a piston 32 and within cylinder 26 is a piston 33. Piston 32 is connected to actuate the upper end of brake shoe 7 by means of an adjustable connection 34 and piston 33 is connected to the upper end of shoe 11 by means of an adjustable connection 35. A part of connection 34 carries a gear 36 and a part of connection 35 carries a gear 37, these gears being connected by an idler gear 38 carried on a plate 39 supported at its opposite ends on the connections. Meshing with gear 37 is an actuating gear 40 carried on a shaft 41. Gear 40 and shaft 41 are supported by an L-shaped bracket 42 carried by connection 35. Thus by turning shaft 41 and gear 40, both gears 37 and 36 can be rotated in the same direction simultaneously and through an equal angle, thereby making simultaneous adjustments of the two connections to compensate for lining wear of shoes 7 and 11. This adjustment determines the "off" position of the upper ends of the brake shoes with respect to the drum as pistons 32 and 33 abut against the end walls of their cylinders to provide "off" position stops. Retracting springs 43 and 44 are associated with brake shoes 7 and 11 to release them from the drum when there is no fluid under pressure in the cylinders.

Between the lower end of brake shoe 6 and the lower end of brake shoe 7 is a floating fluid motor 45 which is employed to actuate the lower end of shoe 6 under all conditions and the lower end of shoe 7 when the direction of rotation of the drum permits. A similar floating fluid motor 46 is also provided for the lower ends of brake shoes 10 and 11. The fluid motor 45 comprises a cylinder 47 within which is a piston 48, said piston being connected to the lower end of shoe 7 by a link 49. The cylinder 47 is adapted to be connected at its closed end to the lower end of shoe 6 by an adjustable connection 50. In a similar manner the fluid motor 46 has a cylinder 51 within which is a piston 52 connected to the lower end of shoe 11 by the connection 53. The closed end of the cylinder is connected by an adjustable connection 54 with the lower end of brake shoe 10. Fluid motors 45 and 46 are supported on supporting plate 3 by means of downwardly extending plates 55 and 56 which are provided with slots 57 and 58, respectively, the former receiving a projection 59 carried by cylinder 47 of fluid motor 45 and the latter receiving a projection 60 carried by cylinder 51 of fluid motor 46. The slots permit the cylinders of the fluid motors to have the desired floating movement. A flat washer 61 and a lock washer 62 hold projection 59 in slot 57 and a flat washer 63 and a lock washer 64 hold projection 60 in slot 58. A part of the adjustable connection 50 is provided with a gear 65 and a part of the adjustable connection 54 is provided with a gear 66, these gears being connected by an idler gear 67 journaled on plate 68 supported at its ends by the two connections. A gear 69 meshes with gear 66, said gear 69 being mounted on a shaft 70 journaled in an L-shaped bracket 71 which is supported on fluid motor 46. By turning gear 69, connections 50 and 54 can be adjusted simultaneously in order to change their lengths to compensate for lining wear of the shoes.

The interior of cylinder 47 of fluid motor 45 is in communication with the interior of fluid motor 25 at the top of the brake, said connection being made by a pipe 72. Similarly, the cylinder of fluid motor 46 is placed in communication with fluid motor 26 by a conduit 73. It is seen that by these connections, together with the previously mentioned passage 30 between cylinders 25 and 26, all the fluid motors will be connected together and to conduit 31' coming from the source of fluid pressure. The cylinders 25 and 26 are also inter-connected by a passage 74 (see Figure 2), the open end of which is controlled by a screw 75. This passage and screw permit air to be removed from the cylinders when the fluid motors are being filled with fluid. Retracting springs 76 and 77 are employed to retract the lower ends of shoes 6 and 10 from the drum and to also hold the lower ends of shoes 7 and 11 in engagement with anchor pin 15. A cover plate 1' closes the open side of drum 1.

Referring to the operation of the described brake, let it be assumed that the normal "forward" direction of the member to which the drum is secured is as indicated by the arrow in Figure 1. If fluid under pressure is now transmitted through conduit 30, it will be effective in all the fluid motors. This will cause the upper ends of shoes 7 and 11 to be moved into engagement with the drum. The lower ends of shoes 6 and 10 will also be moved into engagement with the drum by the operation of fluid motors 45 and 46. Under these conditions the shoes will anchor on anchor pins 14 and 15 and each will act as a self-energized or forward shoe, thus giving maximum braking action from each brake "A" and "B." The fluid motors 45 and 46 will not move the lower ends of shoes 7 and 11 away from anchor pin 15 since the force on the upper ends of the shoes, plus the force resulting from the drag of the drum on the brake shoes, is greater than any force from motors 45 and 46 tending to move the shoes away from said anchor pin.

If the drum should be rotating in the direction of rotation opposite that indicated by the arrow when the fluid motors are operated, fluid motors 45 and 46 will be the only ones effective in applying the brake shoes of both brakes "A" and "B." Under these conditions fluid motor 45 will spread the lower ends of shoes 6 and 7 and fluid motor 46 will spread the lower ends of shoes 10 and 11. The upper ends of shoes 10 and 11 will anchor on the supporting plate 3 through the cylinders, pistons, and connections associated therewith, it being noted that the pistons of the fluid motors abut the ends of the cylinders in which they are positioned. When the lower ends of shoes 7 and 11 are actuated, they will be moved away from anchor pin 15. The reason that the upper ends of shoes 7 and 11 are not actuated is that the force applied to the shoes by fluid motors 45 and 46 plus the force resulting from the drag of the drum on the brake shoes is greater than any force which can act on said upper ends.

From the foregoing description of the brake assembly and its operation it is seen that each of the brakes "A" and "B" comprising the dual brake acts in a similar manner and is simultaneously actuated by fluid pressure from a single source. When the drum is rotating in the normal forward direction, all the shoes of both brakes will act as self-energized shoes, thus producing maximum braking action. In the opposite direction of the arrow or the normal reverse direction of rotation of the drum, one shoe of each brake will act as a self-energized or forward shoe and the other shoe of each brake will act as a reverse shoe. This will produce all the necessary braking action required for reverse rotation of the drum, particularly when the brake is to be used on a vehicle. It is to be noted that the dual brake is very compact in construction and that both brakes are mounted on a single central supporting plate which is arranged to have a single member secured thereto in which both of the cylinders of two of the actuating members are embodied.

In instances where it is desirable to facilitate bleeding of the fluid motors, the lower fluid motors may be connected together and provided with a bleeder valve. Such a construction is shown in Figure 5. The cylinder 47' of the fluid motor 45' is provided with a lateral projection 78 having a passage 79. In a similar manner cylinder 51' of the fluid motor 46' has a projection 80 having a passage 81. The ends of the two projections lie closely adjacent each other and passages 78 and 81 are connected by a connector 82 comprising a yieldable sealing member 83 surrounding a short tube 84. The connector is held in sealed relation with the projections by the connection between the cylinders and plates 55' and 56'. A bolt 85 is provided to prevent these plates from spreading. Pipes 72 and 73 are connected to cylinders 47' and 51' as shown. Cylinder 51' is provided with a bleeder passage 86 which is controlled by a screw bleeder valve 87.

From the foregoing it is seen that by means of the connection between the fluid motors and the bleeder passage and valve, cylinders 47' and 51' may be readily bled. Also, the connection between the cylinders insures substantially instantaneous equal pressures in both fluid motors. Since connector 82 is yieldable, any slight relative movement between the cylinders will be compensated for without injury to the connector.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking mechanism, a brake drum, a supporting plate, to brake shoes mounted for pivotal movement on opposite sides of the plate and having adjacent actuatable ends, means for actuating said ends comprising a single unitary member secured to said support with cylinder portions positioned on opposite sides of the plane of the plate, duct means in said member leading to and for placing the cylinders in communication with each other, pistons in the cylinders, and a single means operable from the exterior of said drum and supporting plate assembly adjustably connecting each piston with respect to the actuatable end of each associated brake shoe.

2. In braking mechanism, a brake drum, a supporting plate, two brake shoes mounted for pivotal movement on opposite sides of the plate and having adjacent actuatable ends, means for actuating said ends comprising a single unitary member provided with two cylinders having parallel axes, means for securing the member to the plate so that a cylinder is positioned on each side of the plane thereof, said member having a passage therein leading to and placing the cylinders in communication with each other and a piston in each cylinder and adjustably connected to a shoe end, and a single means operable from the exterior of said drum and supporting plate assembly adjustably connecting each piston with respect to the actuatable end of each associated brake shoe.

3. In braking mechanism, a supporting plate, two brake shoes mounted for pivotal movement on opposite sides of the plate and having adjacent actuatable ends, two cylinders positioned on opposite sides of the plane of the plate, means for securing said cylinders to the peripheral edge portion of the plate, duct means in said member leading to and for placing the cylinders in communication with each other, a piston in each cylinder, means for operatively connecting each piston to an actuatable end of a brake shoe, and a single means operable from the exterior of said drum and supporting plate assembly adjustably connecting each piston with respect to the actuatable end of each associated brake shoe.

4. In braking mechanism, a supporting plate, two brake shoes mounted for pivotal movement on opposite sides of the plate and having adjacent actuatable ends, two cylinders positioned on opposite sides of the plane of the plate, means for securing said cylinders to the peripheral edge portion of the plate, means for placing the cylinders in communication with each other, a piston in each cylinder, means for operatively connecting each piston to an actuatable end of a brake shoe, said piston and cylinder associated with each shoe acting as an anchor means for said actuatable end of said shoe, means comprising a cylinder and piston for actuating the other end of each shoe, and conduit means for placing all the cylinders in communication with each other.

5. In braking mechanism, a supporting plate, two brake shoes mounted for pivotal movement on opposite sides of the plate and having adjacent actuatable ends, two cylinders positioned on opposite sides of the plane of the plate, means for securing said cylinders to the plate, means for placing the cylinders in communication with each other, a piston in each cylinder, means for operatively connecting each piston to an actuatable end of a brake shoe, said piston and cylinder associated with each shoe acting as an anchor means for said actuatable end of said shoe, means comprising a cylinder and piston for actuating the other end of each shoe, a conduit for placing the cylinders at the ends of one shoe in communication with each other, and another conduit for placing the cylinders at the ends of the other shoe in communication with each other.

6. In braking mechanism, a brake drum, a supporting plate, two brake shoes positioned on opposite sides of the plate in parallel planes, means for anchoring both ends of each shoe, two cylinders positioned on opposite sides of the plane of the plate and adjacent like ends of the shoes, means for securing said cylinders to the peripheral edge portion of the plate, a piston in each cylinder, means for adjustably connecting each piston to one end of a shoe, a fluid motor for actuating the other end of each shoe, fluid pressure supply conduit means, means for placing the two cylinders and the two fluid motors in communication with the conduit means, duct means for connecting said cylinders in communication with each other, and means for simultaneously operating each of said adjusting means from a position remote from said plate.

7. In braking mechanism, a brake drum, a supporting plate, two brake shoes positioned on opposite sides of the plate in parallel planes, means for anchoring both ends of each shoe, two cylinders positioned on opposite sides of the plane of the plate and adjacent like ends of the shoes, means for placing the cylinders in communication with each other, means for securing said cylinders to the plate, a piston in each cylinder, means for adjustably connecting each piston to one end of a shoe, a fluid motor for actuating the other end of each shoe, fluid pressure supply conduit means connected to one cylinder, a conduit connecting one cylinder with a fluid motor, a second conduit connecting the other cylinder with the other fluid motor, and means for simultaneously operating each of said adjusting means from a position remote from said plate.

8. In braking mechanism, a brake drum, a fixed annular supporting member, two anchor pins carried by the supporting member in diametrical relation and having portions extending from opposite sides of the member, two brake shoes positioned on each side of the supporting member in end-to-end relation with each brake shoe pivotally associated with an anchor pin, two cylinders positioned on opposite sides of the plane of the supporting member adjacent the ends of corresponding shoes on opposite sides of the supporting member and remote from ends which are associated with an anchor pin, means for securing the cylinders to the peripheral edge of the supporting member, pistons in the cylinders for actuating the adjacent shoe ends, anchor means for the shoe ends actuated by the pistons, a fluid motor for applying a spreading force to the adjacent ends of the two shoes on one side of the supporting plate which are remote from the end actuated by a piston, a fluid motor for applying a spreading force to the adjacent ends of the two shoes on the other side of the supporting plate which are remote from the end actuated by a piston, a conduit leading from a source of pressure, and means for connecting said conduit to the two cylinders and to the fluid motors.

9. In braking mechanism, a brake drum, a fixed annular supporting member, two anchor pins carried by the supporting member in diametrical relation and having portions extending from opposite sides of the member, two brake shoes positioned on each side of the supporting member in end-to-end relation with each brake shoe pivotally associated with an anchor pin, two cylinders positioned on opposite sides of the plane of the supporting member adjacent the ends of corresponding shoes on opposite sides of the supporting member and remote from ends which are associated with an anchor pin, means for securing the cylinders to the peripheral edge of the supporting member, pistons in the cylinders for actuating the adjacent shoe ends, anchor means for the shoe ends actuated by the pistons, a fluid motor for applying a spreading force to the adjacent ends of the two shoes on one side of the supporting plate, a fluid motor for applying a spreading force to the adjacent ends of the two shoes on the other side of the supporting plate which are remote from the end actuated by a piston, means for supporting the fluid motors on the supporting member for movement relative thereto, a conduit leading from a source of pressure, and means for connecting said conduit to the two cylinders and the fluid motors.

10. In braking mechanism, a brake drum, a fixed annular supporting member, two anchor pins carried by the supporting member in diametrical relation and having portions extending from opposite sides of the member, two brake shoes positioned on each side of the supporting member in end-to-end relation with each brake shoe pivotally associated with an anchor pin, two cylinders positioned on opposite sides of the plane of the supporting member adjacent the ends of corresponding shoes on opposite sides of the supporting member and remote from ends which are associated with an anchor pin, means for securing the cylinders to the peripheral edge of the supporting member, pistons in the cylinders for actuating the adjacent shoe ends, anchor means for the shoe ends actuated by the pistons, a fluid motor for applying a spreading force to the adjacent ends of the two shoes on one side of the supporting plate which are remote from the end actuated by a piston, a fluid motor for applying a spreading force to the adjacent ends of the two shoes on the other side of the supporting plate which are remote from the end actuated by a piston, a conduit leading from a source of pressure, means for connecting said conduit to the two cylinders and to the fluid motors, a conduit connecting the two fluid motors, an outlet from one fluid motor, and a valve for controlling the outlet.

11. In dual brake mechanism, a support, two shoes mounted on each side of the plane of the support, a floating fluid motor for spreading adjacent ends of two shoes on one side of the support, a second floating fluid motor for spreading adjacent ends of the two shoes on the other side of the support, each fluid motor comprising a cylinder and a piston, means for supporting each cylinder of a fluid motor on the support for relative sliding movement, a connection for placing the cylinders in communication with each other, an outlet from one cylinder, and a valve for controlling the outlet.

12. In dual brake mechanism, a support, two shoes mounted on each side of the plane of the support, a floating fluid motor for spreading adjacent ends of two shoes on one side of the support, a second floating fluid motor for spreading adjacent ends of the two shoes on the other side of the support, each fluid motor comprising a cylinder and a piston, means for supporting each cylinder of a fluid motor on the support for relative sliding movement and comprising spaced slotted plates secured to the support, projections on the cylinders received in the slots, means for holding the projections in the slots, and a conduit means for placing the cylinders in communication with each other comprising a connection permitting relative movement between the cylinders.

CLARENCE J. WHITACRE.